United States Patent [19]

Guritz et al.

[11] 4,139,725
[45] Feb. 13, 1979

[54] DUCT JUNCTION FITTING

[76] Inventors: Kenneth E. Guritz, 570 Emerald Harbor Rd., Sarasota, Fla. 33577; Michael L. Guritz, 910 Riverside Dr. E., Bradenton, both of Fla. 33505

[21] Appl. No.: 656,718

[22] Filed: Feb. 9, 1976

[51] Int. Cl.² ............................................. H02G 3/12
[52] U.S. Cl. ......................................... 174/49; 174/57; 220/3.7; 52/221
[58] Field of Search .............. 174/48, 49, 57, 96, 174/98; 220/3.2, 3.3, 3.4, 3.5, 3.7; 52/221

[56] References Cited

U.S. PATENT DOCUMENTS

| | | | |
|---|---|---|---|
| 2,919,827 | 1/1960 | Cubberley | 220/3.7 |
| 2,936,091 | 5/1960 | Clark | 220/3.4 |
| 3,061,663 | 10/1962 | Reiland | 174/49 |
| 3,701,837 | 10/1972 | Fork | 174/49 X |
| 3,784,042 | 1/1974 | Hadfield et al. | 174/48 X |

Primary Examiner—J. V. Truhe
Assistant Examiner—David A. Tone

[57] ABSTRACT

An underfloor system of ducts utilized for power and signal distribution utilizes a combination duct junction fitting which provides access to two parallel ducts while maintaining protective isolation between the ducts. The combination fitting serves to join pairs of ducts in end to end spaced apart relation, adjustably support the ducts above a base floor surface, maintain ground integrity of the system and selectively provide a duplex electrical receptacle which can be accessed from the surface and which is mounted substantially in the space between the parallel ducts. A tubular adapter is adjustable to the height of the fill above the fitting and provide for the attachment of either a closure or an above surface fitting.

4 Claims, 5 Drawing Figures

DUCT JUNCTION FITTING

FIELD OF INVENTION

This invention relates to a combination junction fitting for a system which utilizes electrical duct to provide high tension and low tension services or a plurality of different classes of power or signal services through a single floor access opening.

BACKGROUND OF THE INVENTION

In one type of floor construction rectangular metal ducts and conduit are secured in place on a base concrete slab and are each provided with one or more individual fittings which are adapted to provide access thereto after the ducts have been covered with concrete to provide a working floor surface. In such construction the ducts and conduit are joined individually end to end by sleeve junctions to provide desired lengths out of standard lengths of duct and conduit, and are secured to the base slab by support brackets which maintain the ducts and conduit at appropriate elevations relative to the base slab.

SUMMARY OF THE INVENTION

In accordance with the present invention, we provide a unitary combination junction fitting structure which serves to: (1) join pairs of ducts in end to end spaced apart relationship to provide access to the ducts; (2) maintain such joined ducts securely to a base slab at a selectively adjustable elevation relative to the slab; (3) provide access to parallel ducts through a single access opening at the finished floor surface; (4) selectively provide an electrical outlet below the finished floor surface without substantially reducing the usable cross section of the joined ducts; and (5) provide for securing a flush or above surface closure to the access opening at the floor surface.

Advantageously, this unitary structure simplifies this installation of under floor duct systems, reduces the number of kinds of duct fittings, and eliminates a short length of duct in each pair of joined ducts for each fitting utilized in the floor system.

BRIEF DESCRIPTION OF THE DRAWING

Our invention will be fully understood and appreciated from the following detailed description when read with reference to the drawing in which.

DETAILED DESCRIPTION

Figure 2:
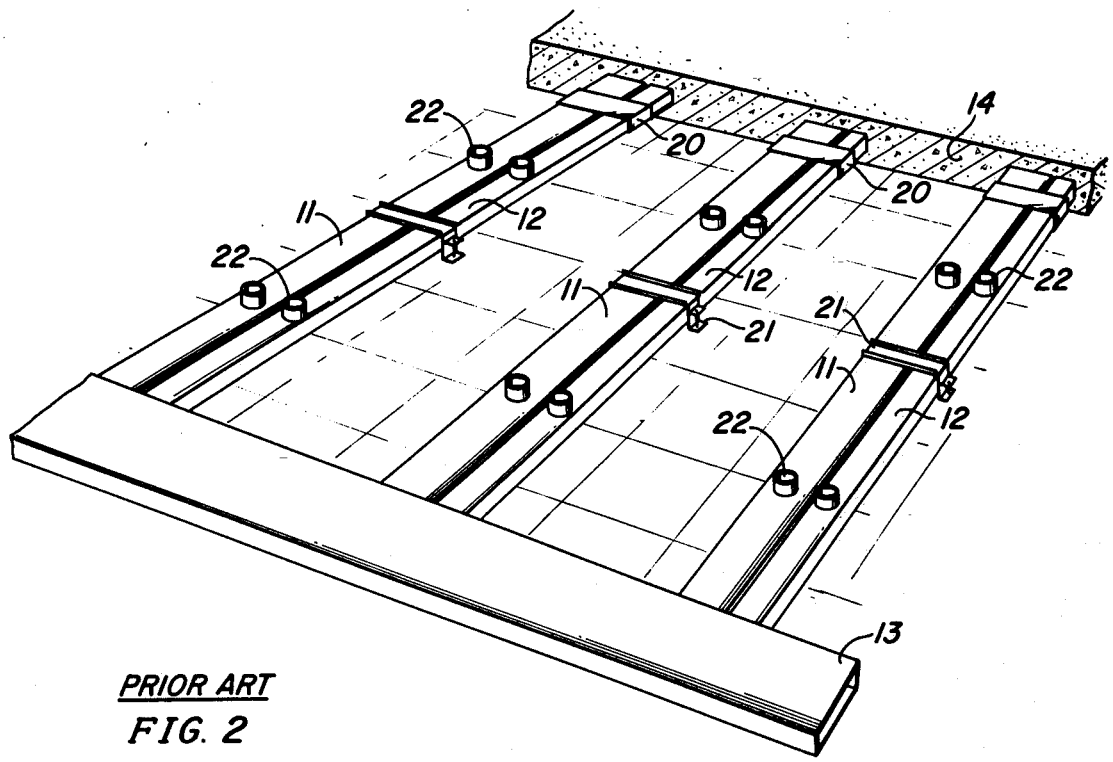
FIG. 2 shows a prior art duct system.

The prior art arrangement of FIG. 2 comprises the header duct 13, the distribution ducts 11 and 12 overlying the base slab 16, the sleeve junction members 20, the support members 21 and the access inserts 22. This entire prior art arrangement is covered with the concrete 14 to the height of the access inserts 22 which are provided with closures during the pouring of the concrete. The ducts 11,12 are typically provided in 10 foot lengths and the access inserts 22 are placed on 5 to 8 foot centers along the length of the ducts. The sleeve junction members 20 are utilized to join standard lengths of duct in abutting end to end relation to provide distribution runs in excess of the standard duct lengths. In FIG. 2 a single header duct 13 is shown crossing the distribution ducts 11 and 12. Typically, however, an additional header duct running parallel to the header 13 will be provided for wires of a second class of service. In a typical installation the smaller duct 12 will be used to distribute power while the larger duct 11 is utilized to distribute for signal wires. Accordingly the first header duct 13 is used to bring power to the smaller ducts 12 while the second header duct is utilized to bring signal wires to the larger distribution ducts 11.

Figure 1:
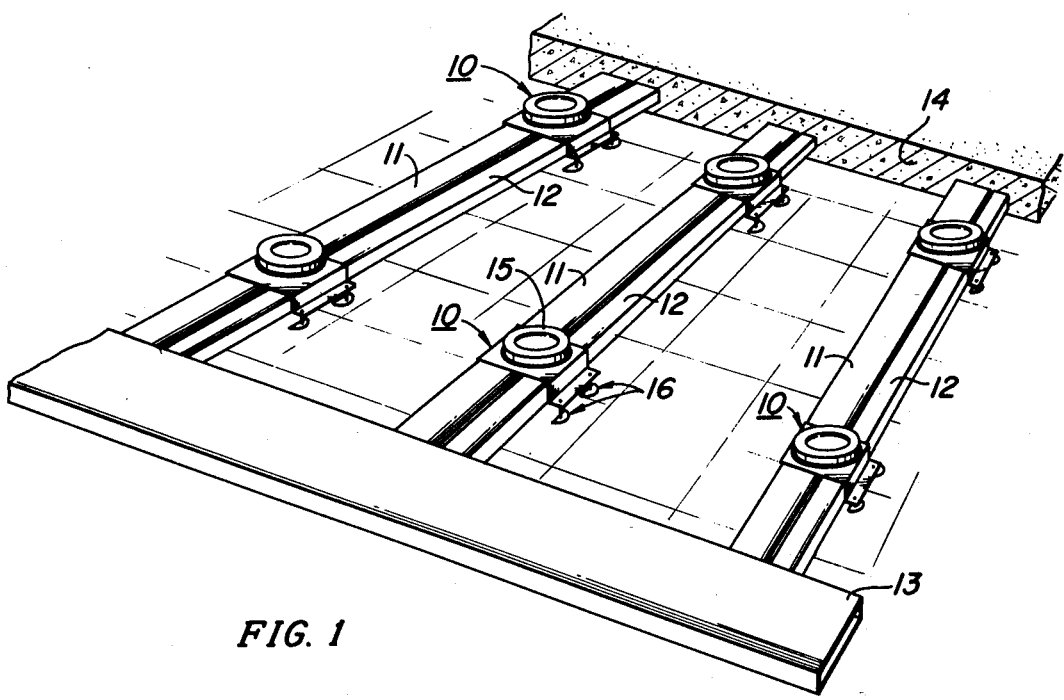
FIG. 1 shows a duct system in accordance with our invention without the finish pour of concrete applied.

FIG. 1 clearly illustrates an underfloor dual service distribution system utilizing our combination junction fitting 10. As will be explained in greater detail herein, each junction fitting 10 serves to: (1) join pairs of ducts 11 and 12 in end to end spaced apart relation, (2) provides access to such joined ducts from the floor surface, (3) through the leveling and support feet 16 serves to securely hold the floor fitting and the duct at a desired level relative to the base slab, and (4) provides mounting surfaces and space between parallel ducts for a duplex electrical service receptacle.

Figure 3:
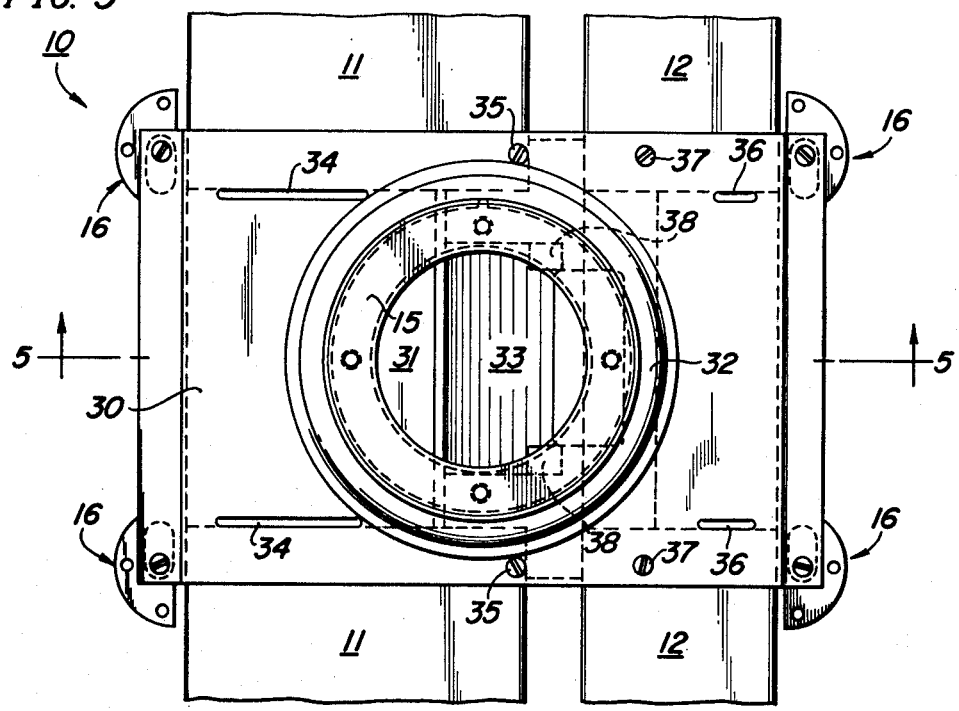
FIG. 3 is a top view of our junction fitting.
Figure 4:
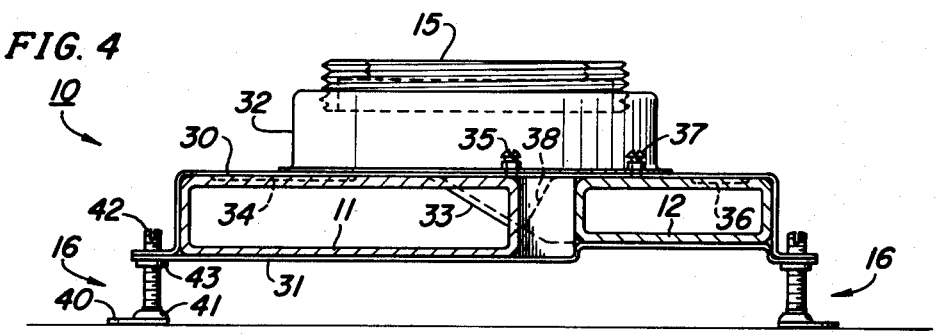
FIG. 4 is an end view of our junction fitting.
Figure 5:
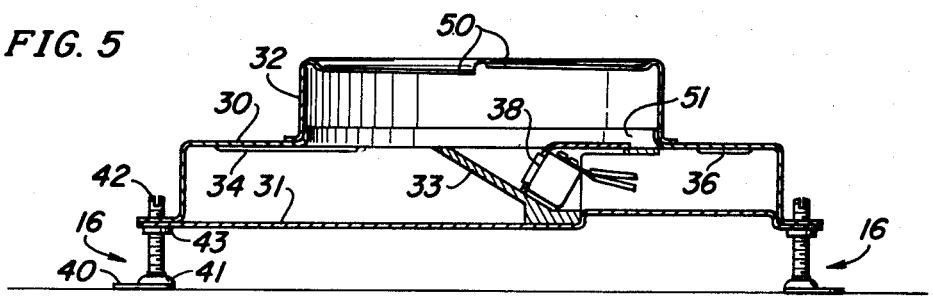
FIG. 5 is a cross sectional view of our junction fitting as taken through the center of FIG. 3 along the line 5—5.

The details of our combination junction fitting 10 will be better understood from a consideration of the detailed FIGS. 3, 4, and 5. The combination junction fitting, as seen in FIG. 4, comprises: an access member 32, and a body having a floor member 31, an upper member 30. A divider 33 separates the body into a first compartment to accommodate a smaller duct 12 and a larger compartment to accomodate the large duct 11. The divider 33 similarly serves to divide the access opening in the access member 32. As indicated earlier herein, in the specific example of the drawing, it is contemplated that power is distributed via the smaller duct 12 and signal wires are distributed via the larger duct 11. The divider 33 serves to maintain the ducts 11 and 12 in spaced apart parallel relation in the region where such ducts invade the body of the junction fitting. This is illustrated in FIGS. 3 and 4. The upper member 30 of the body has downward depending depressions 34 and 36 formed therein to provide stops for the ducts 11 and 12 respectively. With the stops 34 and 36 the ducts 11 and 12 can each enter the body only a limited distance. The grounding screws 35 and 37 serve to securely electrically ground the upper member 30 of the body to the ducts 11 and 12 and to provide electrical continuity between the pairs of ducts which are joined by the junction fitting. As can be seen from FIGS. 4 and 5 the floor member 31 and the upper member 30 of a junction fitting are securely joined together at their edges by the internally threaded rivets 43. The rivets 43 are adapted to engage the threaded portion of the leveling member 16 which comprises the foot 40, the theaded and slotted rod 42 and the cup 41 which is firmly attached to the foot 40. The cup 41 and the threaded rod 42 are engaged such that the threaded rod is free to rotate within the cup, however, since the cup and the foot 40 are secured to the floor the body will move vertically with rotational movement of the threaded rod 42.

The access member 32 is located approximately centrally in the upper member 30 of the junction fitting and thus provides access to the compartments within the body which communicate with the pairs of ducts 11 and 12 which are joined by the combination junction fitting. The access member 32 is flared outwardly at its point of junction with the upper member 30 and in the specific example of the drawing the access member is welded to the upper member 30. As seen in FIG. 5 the upper member 30 is flared in a complementary manner so as to engage the access member 32. With such engagement and with the welding of the two members together there is full assurance of electrical continuity between the floor member 31, the upper member 30 and the access member 32. In the specific illustrative embodiment of the drawing the access member 32 has a single thread integrally formed therein to engage the adapter ring 15. As seen in FIG. 5 the access member 32 has integrally formed therein a single thread 50, which is continuous except for the single notch shown in FIG. 5. The portion of the thread 50 immediately to the right of the notch shown in FIG. 5 is higher than the portion of the thead shown immediately to the left of the notch. The thread tapers uniformly from the point to the right of the notch to the point to the left of the notch. The vertical distance between the edges of the thread 50 immediately to the left and to the right of the notch in FIG. 5 slightly exceeds the pitch of the external thread of the adapter 15. The adapter 15 has an external V type thread which may be cast in the member or may be subsequently machined. Under these conditions of spacing the single thread 50 maintains intimate physical contact with the threads of the adapter 15. The adapter 15 as indicated in FIG. 3 has internal threads which are utilized to engage a surface fitting or a cover plate.

The divider 33 as shown in FIG. 5 has a continuous sloped surface which invades the compartment between two larger ducts 11 which are spaced apart by and are accessed from our junction fitting. Although this sloped surface invades the subject compartment there is room between the bottom thereof and the floor member 31 which permits the storage of telephone connectors and the like.

The divider 33 in the portion of the body separating the compartment for accessing the duct 11 from the compartment for accessing the duct 12, is discontinuous and includes a pair of surfaces 38 which are adapted to support and engage the ears of a duplex service receptacle. The divider 33 is mechanically and electrically attached to the floor member 31 and the upper member 30. Accordingly all of the members of the junction fitting are both mechanically and electrically connected and ducts joined by the junction fitting have electrical continuity for purposes of providing a protective ground to and through the fitting.

In the illustrative embodiment of FIGS. 1, 3, 4 and 5 the junction fitting 10 has been utilized to join together in spaced apart end to end relationship ducts of equal size. However, clearly, although not shown in the drawing, it is possible to use the junction fitting as a terminal fitting in which case appropriate plugs can be placed in place of an added section of duct. Furthermore, through the use of adapters ducts of unequal size may be joined in end to end spaced apart relationship by our junction fitting. Similarly through the use of adapters lengths of conduit may be joined one to the other or a length of conduit may be joined to a duct.

What is claimed is:

1. A combination fitting comprising: a (rectangular) tubular body comprising first and second open ends, means dividing said body into first and second side-by-side compartments laterally isolated one from the other and dividing each of said ends into first and second openings; said first and second compartments respectively extending between said first openings and said second openings of said first and second open ends; and said dividing means comprising means to receive and hold an electrical receptacle substantially within the vertical and lateral dimensions of said dividing means; and said fitting further comprises: support means for securing said body to a supporting base surface; and access means comprising a tubular section upwardly depending from said body and overlying an opening therein and providing access to said first and second compartments and to any electrical receptacle mounted on said dividing means, said access means adapted to receive and hold access closure means.

2. A junction fitting in accordance with claim 1 wherein said support means are adjustable.

3. A junction fitting in accordance with claim 1 in combination with access closure means wherein said tubular access section comprises at least one integral thread and said closure means comprises a threaded sleeve engaging said one thread and means for at least partially closing said sleeve.

4. A junction fitting in accordance with claim 1 wherein said first and second openings in each of said ends are adapted to receive and securely hold corresponding ducts in parallel spaced apart relation.

* * * * *